United States Patent

Foster et al.

[11] Patent Number: 6,042,041
[45] Date of Patent: Mar. 28, 2000

[54] PRETENSIONER

[75] Inventors: Howard John Foster, Carlisle, United Kingdom; Juergen Arold, Burgobarbach, Germany; Tony Jain, Bloomfield Hills, Mich.

[73] Assignee: Breed Automotive Technology, Inc., Lakeland, Fla.

[21] Appl. No.: 09/252,734

[22] Filed: Feb. 19, 1999

[30] Foreign Application Priority Data

Apr. 22, 1998 [GB] United Kingdom .................. 9808610

[51] Int. Cl.⁷ ............................................ B60R 22/46
[52] U.S. Cl. ............................................................ 242/374
[58] Field of Search ........................... 242/374; 280/806; 297/478, 480; 60/632, 634, 638

[56] References Cited

U.S. PATENT DOCUMENTS

| | | | |
|---|---|---|---|
| 4,237,690 | 12/1980 | Tsuge et al. ............................ | 280/806 |
| 4,434,953 | 3/1984 | Gemar et al. ........................... | 242/374 |
| 4,573,322 | 3/1986 | Fohl ........................................ | 280/806 |
| 5,450,723 | 9/1995 | Fohl ........................................ | 280/806 |
| 5,634,690 | 6/1997 | Watanabe et al. ....................... | 242/374 |

FOREIGN PATENT DOCUMENTS 0629531   6/1994   European Pat. Off. ............... 242/374

Primary Examiner—John M. Jillions
Attorney, Agent, or Firm—Beth Vrioni; Lonnie Drayer

[57] ABSTRACT

A pretensioner for a seat belt system has first and second piston-cylinder arrangements arranged generally one on each side of a spool shaft so that in travelling along the respective cylinder, each piston engages the periphery of the spool shaft and causes it to rotate. A sensor is responsive to a crash situation to detonate a first piston drive means, and means for detonating a drive means for the second piston at the end of the stroke of the first piston. The spool shaft may be a component of a seat belt retractor. Alternatively, the spool shaft is wound with a cable that pulls on a seat belt or seat belt buckle.

4 Claims, 3 Drawing Sheets

PRETENSIONER

FIELD OF THE INVENTION

The present invention relates generally to a pretensioner for a vehicle occupant safety restraint and more particularly to a buckle pretensioner.

BACKGROUND OF THE INVENTION

Pretensioners are used to rapidly pull in any slack in a safety restraint seat belt at the onset of a crash to securely restrain a vehicle occupant against forward movement and potential injury by collision with internal features of the vehicle. In addition, the pretensioning operation aims to pull the vehicle occupant into, or at least towards, the correct seating position to maximise the effect of a second restraint, such as an airbag.

A modern seat belt is known as a 3-point restraint because it is secured to the vehicle at three points arranged about the vehicle occupant to provide a diagonal torso section and a horizontal lap portion to hold the vehicle occupant in the seat. The belt is attached to the vehicle by a spring-loaded retractor tending to pull in the belt, and by a buckle for quick release of the belt.

Pretensioners can be at either the retractor or the buckle end of the seat belt. The present invention relates particularly to a retractor end pretensioner and aims to provide an improved and more compact pretensioner than hitherto known.

SUMMARY OF THE INVENTION

According to a first aspect of the present invention there is provided a pretensioner for a seat belt retractor of a vehicle occupant safety system, the pretensioner comprising first and second piston-cylinder arrangements, arranged generally one on each side of a retractor spool shaft so that in travelling along the respective cylinder, each piston engages the periphery of the spool shaft and causes it to rotate, there being a sensor responsive to a crash situation to detonate a first piston drive means, and means for detonating a drive means for the second piston at the end of the stroke of the first piston.

Preferably the second piston drive means is detonated by a firing pin at one end of the second cylinder, and the firing pin is mounted on a leaf spring which passes across the width of the second cylinder and across the width of the first cylinder, so as to cross the path of the first piston. Impact of the first piston on one end of the leaf spring, flexes it and causes the other end to move the firing pin into the detonator of the second drive means.

Alternatively gas from the first cylinder could be used directly to drive the second piston or could be used to fire the second drive means, for example a gas generator in the form of a container of compressed gas or a gas generator.

According to one embodiment of the invention the first piston has teeth engaging teeth on the spool shaft whereas the second piston does not have teeth and drives the shaft by friction. This combination provides an efficient drive mechanism but avoids problems encountered in engaging the second piston with the rapidly moving shaft teeth since a friction drive does not require any accurate meshing of two sets of teeth which would be the case if teeth were present on the second piston. Bringing gear teeth into engagement at high velocity imposes high forces and tends to impact the teeth without accurate meshing.

Preferably the teeth on the first piston extend right around the outer surface of the piston which is advantageously cylindrical. This allows the piston to work equally efficiently even if some turning movement occurs during travel of the piston along its cylinder. In a non-circular piston jamming may occur.

According to a second aspect of the invention there is provided a breakable seal across the first cylinder, which is arranged to break when a predetermined pressure is reached. Preferably this seal is designed to melt at a predetermined temperature to exhaust any excess gases in the pretensioner and as a safety feature in the event of a fire or other hot environment. This could be incorporated into the piston as part of a burst-disc.

According to a third aspect of the invention there is provided a cradle, preferably of steel, supporting the spool shaft pinion, connected to the frame of the retractor. This transfers load from the pretensioning operation into the frame of the retractor to avoid such load being borne by any plastic parts such as a cover. The cradle may also incorporate a force absorbing feature, for example if cut-outs or other weakening is introduced into the wall or walls of the cradle to absorb some of the energy of the moving piston and thus prevent it from exiting from the cylinder at high speed which would be rather dangerous.

According to a fourth aspect of the present invention there is provided a pretensioner for a vehicle occupant safety system arrangement, the pretensioner comprising a piston mounted in a guide chamber for translational movement tangentially to a spool shaft, so that in travelling through the guide chamber, the piston engages the periphery of the spool shaft and causes it to rotate, and wherein the region of the chamber into which the piston moves after engaging the shaft, has a wall which is weakened so as to be deformable to absorb force from the movement of the piston towards the end of a piston stroke.

The pretensioner may be used directly with a seat belt retractor in which case the spool is the spool of the retractor itself and provides for a compact and efficient retractor pretensioner. However, it can also be used with a seat belt buckle if the spool is wound with a cable, which pulls at the seat belt or the buckle mounting.

The guide chamber for the piston may comprise a cylinder (which may have a rounded or substantially rectangular cross section, depending upon the corresponding cross-section of the piston), optionally in combination with a load-bearing cradle supporting the spool shaft. Either the wall of the cylinder or the wall of the cradle may be used for absorbing the kinetic energy of the piston. For example, the cylinder may be closed and its side walls at one end weakened so as to be deformable. Alternatively the cylinder may be mounted in a load-bearing cradle which also supports the spool shaft. The walls of the end of the cradle are weakened, for example by means of cut-outs, and the kinetic energy of the piston absorbed in this way by the cradle as the cut-outs allow the wall effectively to stretch.

BRIEF DESCRIPTION OF THE DRAWINGS

For a better understanding of the present invention and to show the same may be carried into effect, reference will now be made by way of example to the accompanying drawings.

DETAILED DESCRIPTION OF THE INVENTION

Figure 1:
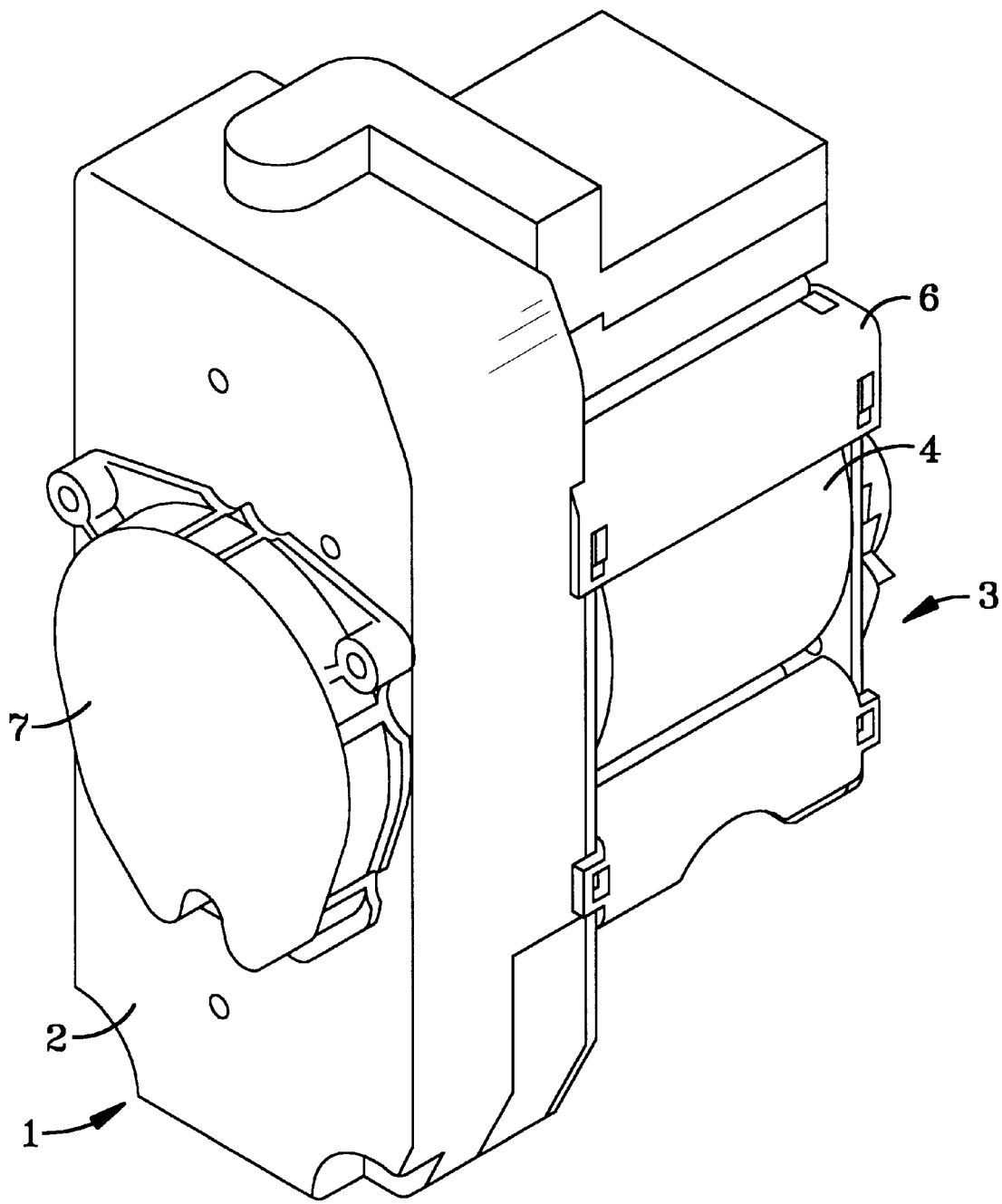
FIG. 1 is a perspective view of a retractor attached to a pretensioner according to the present invention.

In FIG. 1 the pretensioner is shown housed in a compact housing 2 that clips onto one side of a retractor 3 to form a compact and relatively inexpensive combination retractor pretensioner.

The retractor comprises webbing 4 wound on a spool 5, which is mounted for rotation within a retractor frame 6. The spool 5 is biased to a webbing wound condition by a clock spring connected to the spool axis and protected by a cover 7.

Figure 2:
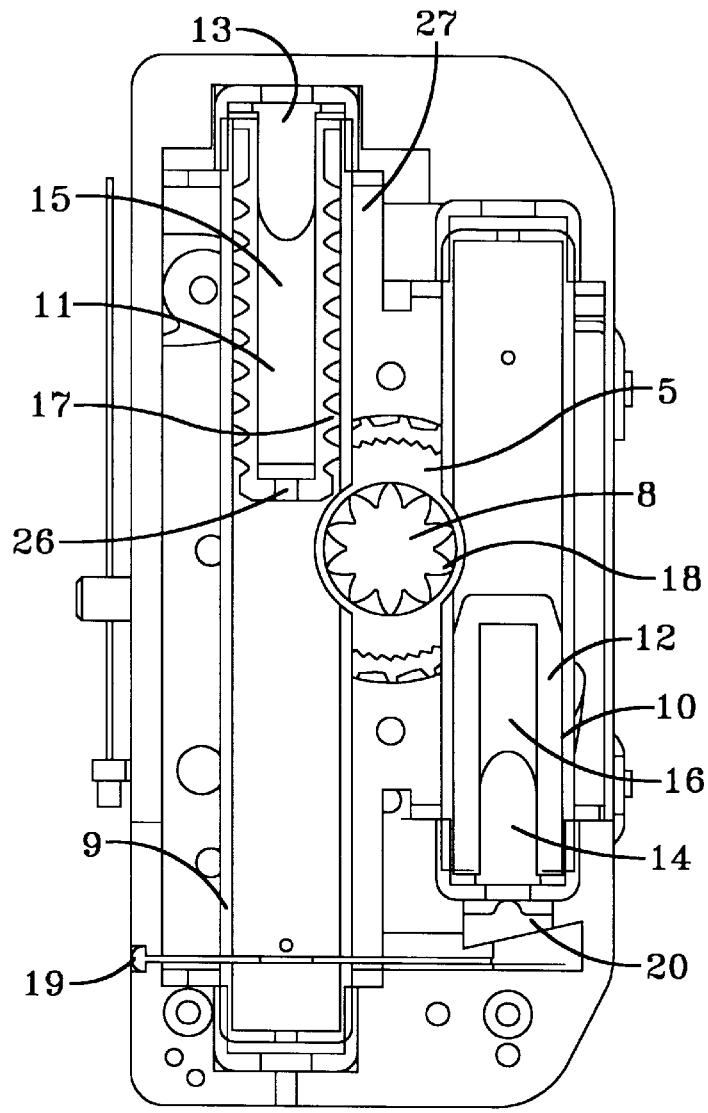
FIG. 2 is a cross-sectional view of a pretensioner according to the first aspect of the invention.

FIG. 2 shows a pretensioner in more detail, in cross-section. The spool 5 has a toothed shaft 8 extending out through the side of the retractor frame 6 and into the pretensioner housing 7. Within the pretensioner housing and on opposite sides of the spool shaft 8 are mounted first and second cylinders 9 and 10 with openings in their sides in the vicinity of the centrally placed spool shaft. Pistons 11, 12 are located within the cylinders 9 and 10 respectively, at opposite ends of the cylinders. The pistons 11 and 12 are generally cylindrical with circular cross-sections and are guided by the cylinder for movement tangential to the toothed shaft 8. The first piston 11 has teeth whereas the second 12 doesn't. The leading edge of the second piston in the direction of pretensioning movement is angled to give a more gradual engagement of the spool shaft teeth with the second piston 12.

Figure 3:
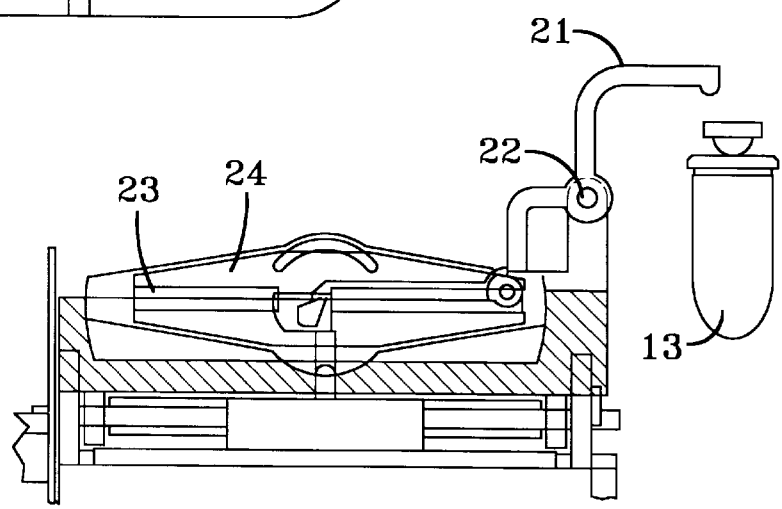
FIG. 3 is a cross-sectional view of a mechanical sensor, which may be used with a pretensioner according to the invention.

Two gas generators 13, 14 are mounted in respective recesses 15, 16 in the respective pistons 11, 12. The first gas generator 13 is detonated by release of stored force in a spring (not shown) when an emergency situation is detected by a sensor. A suitable mechanical sensor is shown in FIG. 3, which is described later. However electrical and electronic sensors are contemplated and hence the gas generator may be electrically detonated.

The mechanical form of the emergency sensor is typically a mass-spring deceleration sensor which releases energy from a tensioned extension spring to drive a firing pin into the gas generator 13 which consequently releases gas into recess 15. The presence of this gas drives the piston 11 along the cylinder 9, past the shaft 8. The teeth 17 on the piston 11 engage the teeth 18 on the spool shaft 8 and causes it to rotate, hence causing the spool to rotate and wind in some webbing.

When the piston 11 reaches the end of the cylinder 9 it hits a leaf spring 19 which extends across the width of the cylinder 9 and across the pretensioner housing to a position below the second cylinder 10, and specifically below a firing pin 20 for the second gas generator 14. The impact of the piston 11 bends the leaf spring 19 and the far end of the spring 19 forces the firing pin 20 into the second gas generator 14. The gas generator 14 releases gas into a recess 16 in the second piston 12. The pressure in the recess 16 drives the piston 12 along the cylinder 10 and engages the outer surface of the piston 12 by friction with the teeth 18 of the shaft 8. Thus more momentum is imparted to the shaft and the retractor spool rewinds more webbing than it would with a single stroke. Preferably the first piston provides at least one full spool revolution before the second piston is fired.

A cradle 27 supports the shaft 8 of the spool 5 and transfers any pyrotechnic force to the pretensioner frame ensuring that there is effectively no load on the plastic cover of the pretensioner.

Safety lockout devices such as occupant sensor lockout, build and testing safety lockout will be incorporated in manner known to persons skilled in the art. In addition the pretensioner should be arranged only to be armed only upon installation into the vehicle to enable safe transport of the pretensioner.

A pressure relief plug 26 is arranged to blow when a predetermined maximum pressure is reached and to melt when temperatures are high.

FIG. 3 illustrates a mechanical sensor for the pretensioner of FIGS. 1 and 2. The gas generator 13 is shown in close proximity to a firing arm 21 which is hinged at 22 and connected at its other end to a sensor spring 23 against which slides an inertial mass 24. Under rapid decelerating conditions indicating a vehicle crash, the mass slides and releases the torsion spring, causing the firing arm 21 to pivot into the gas generator 13 to detonate it (typically at a minimum speed of 2 milliseconds).

As mentioned already, electrical, or electronic, detonation of the gas generator is also envisaged and the possibility of adaptation for this will be evident to a person skilled in the art.

The mechanical sensor of FIG. 3 has special features including a 10-degree angle flexibility and the possibility of relatively easy safety lockout for testing and assembly. It can also be adapted for occupant sensing.

Figure 4:
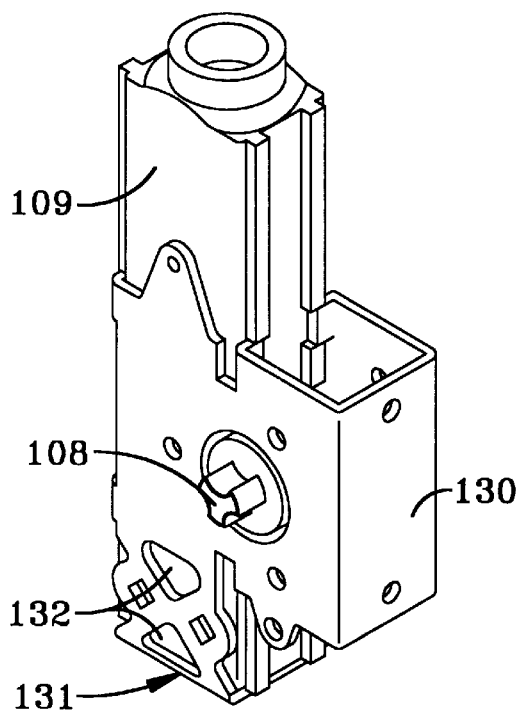
FIG. 4 is a perspective view of a pretensioner according to another aspect of the present invention, in the unactivated state.
Figure 5:
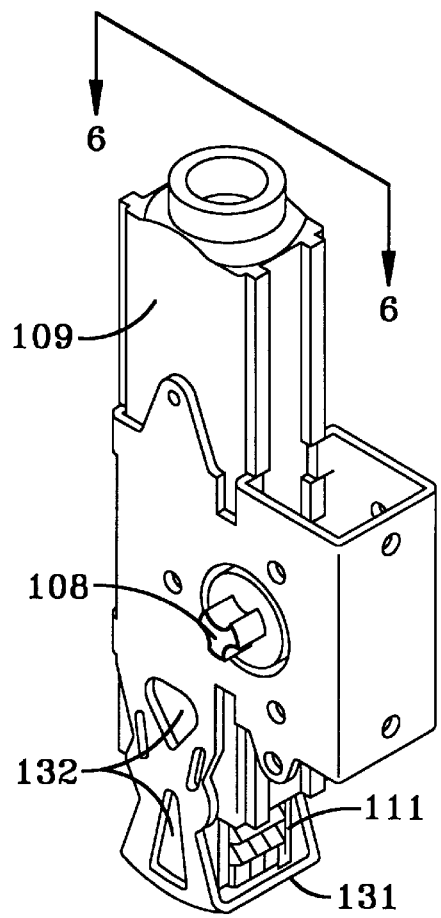
FIG. 5 shows the pretensioner of FIG. 4 in the activated state.
Figure 6:
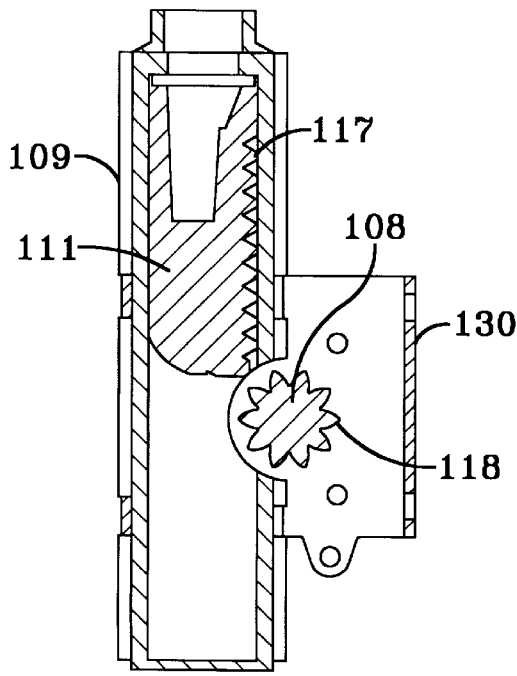
FIG. 6 is a cross sectional view of the pretensioner of FIG. 4.

FIGS. 4 to 6 illustrate another aspect of the present invention. This pretensioner is shown in perspective in FIGS. 4 and 5 and in cross-section in FIG. 6. This embodiment uses a single piston 111 arranged on one side of a rotatably mounted spool shaft 108. The piston 111 is mounted to be slidably movable along the inside of a cylinder 109 and so as to contact the spool shaft in the mid part of its stroke. It is driven by a gas generator (not shown) and teeth 117 on the piston 111 engage teeth 118 on the spool shaft 108 and cause the spool shaft to turn.

The cylinder 109 is supported in a load-bearing cradle 130, which may be made of steel, and which cradle also supports the spool shaft 108 for rotation. The lower parts of the side walls of the cradle 130 are weakened with cutout portions 132. At its lower end the cylinder 111 is open and the moving piston therefore exits the cylinder after it has moved past and turned the spool shaft. It then impacts the end wall 131 of the cradle 130, as shown in FIG. 5, and the force of impact stretches the sides of the cradle in the regions of cut-outs 132. Alternatively the end of the cylinder may be closed with a weak end wall which fractures relatively easily but which also absorbs some of the force of the piston 111.

The cutouts 132 may take a variety of shapes. Those illustrated are generally triangular and diamond shaped, so as to leave a diagonal lattice structure of metal in that region of the cradle. The force of the piston 111 pulls the diagonal shaped cutouts into more vertical lines as the piston slows. Other shapes will be evident to a person skilled in the art: for example horizontal line cutouts would also effect the requisite weakening of the walls of the cradle. It is however desirable to avoid the wall shearing or fracturing altogether since this would allow the piston to escape from the safety arrangement releasing a projectile into the vehicle occupant seating area.

While the above description discloses preferred embodiments of the invention, it will be appreciated that the invention is susceptible to modifications, variations and changes without departing from the proper scope and fair meaning of the claims.

What is claimed is:

1. A pretensioner for a seat belt system comprising first and second piston-cylinder arrangements, arranged generally one on each side of a spool shaft so that in travelling along the respective cylinder, each piston engages the periphery of the spool shaft and causes it to rotate, a sensor is responsive to a crash situation to detonate a first piston drive means, and means for detonating a drive means for the second piston at the end of the stroke of the first piston, wherein the second piston drive means is detonated by a firing pin at one end of the second cylinder, and the firing pin is mounted on a leaf spring which passes across the width of the second cylinder and across the width of the first cylinder, so as to cross the path of the first piston.

2. The pretensioner for a seat belt system of claim 1 wherein the impact of the first piston on one end of the leaf spring, flexes it and causes the other end to move the firing pin into the detonator of the second drive means.

3. A pretensioner for a seat belt system comprising first and second piston-cylinder arrangements, arranged generally one on each side of a spool shaft so that in travelling along the respective cylinder, each piston engages the periphery of the spool shaft and causes it to rotate, a sensor is responsive to a crash situation to detonate a first piston drive means, and means for detonating a drive means for the second piston at the end of the stroke of the first piston, wherein the first piston has teeth engaging teeth on the spool shaft whereas the second piston does not have teeth and drives the shaft by friction.

4. The pretensioner for a seat belt system of claim 3 wherein the teeth on the first piston extend right around the outer surface of the piston which is advantageously cylindrical.

* * * * *